3,138,628
GUANYLDITHIOCARBAMATE

Antje Kaars Sijpesteijn, Utrecht, Netherlands, assignor to North American Philips Company, Inc., New York, N.Y., a corporation of Delaware
No Drawing. Filed June 3, 1960, Ser. No. 33,654
Claims priority, application Netherlands June 4, 1959
7 Claims. (Cl. 260—455)

It was known that certain N.N-dialkyldithiocarbamates, in which an organic radical is bound to one of the sulphur atoms by means of a carbon atom, and in which no nitrogen atom is bound to that carbon atom, have fungicidal and bactericidal activities.

In addition it was known that tetramethylthiuramoxide and tetramethylthiurammonosulphide have fungicidal and bactericidal activities.

Applicants have found that a group of new dithiocarbamates, in which a guanyl radical, of which one or more hydrogen atoms may be substituted by alkyl,- aralkyl- or aryl radicals, is bound to one of the sulphur atoms of the dithiocarbamate radical, have fungicidal and bactericidal activities.

The present invention relates to a process for the preparation of new, fungicidal and bactericidal dithiocarbamates, characterized in that S-guanyl-N.N-dialkyldithiocarbamates, S-guanyl-N.N-alkylenedithiocarbamates and S-guanyl-N.N-alkylidenedithiocarbamates, of which one or more hydrogen atoms of the guanyl radical may be replaced by alkyl radicals, aralkyl radicals or aryl radicals, and salts thereof, are prepared in the manners known for this type of compounds, manners analogous thereto or described herein.

More particularly the invention relates to the preparation of compounds of the general formula

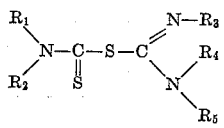

and salts thereof in which formula $R_1$ and $R_2$ each may represent an alkyl group having 1–3 carbon atoms, or together an alkylene group or alkylidene group which, together with the nitrogen atom forms a ring of at most 6 atoms, and $R_3$, $R_4$ and $R_5$ may each represent hydrogen or an alkyl group having 1–12 carbon atoms, an aralkyl group or an aryl group.

The compounds according to the invention are preferably prepared by reacting a N.N-dialkyl-, N.N-alkylene- or N.N-alkylidene-thiocarbamylhalogenide, preferably -chloride, with thio-urea or a derivative thereof, in which to one or to each of the nitrogen atoms an alkyl group having 1–12 carbon atoms, an aralkyl group or an aryl group is bound.

Compounds according to the invention are i.a.:
S-guanyl-N.N-dimethyl-,
S-guanyl-N.N-diethyl-,
S-guanyl-N.N-di-n-propyl-,
S-guanyl-N.N-di-isopropyl-,
S-guanyl-N.N-tetramethylene-,
S-guanyl-N.N-pentamethylene-dithiocarbamate,
S-(N-methylguanyl)-,
S-(N.N-dimethylguanyl)-,
S-(N-ethylguanyl)-,
S-(N-propylguanyl)-,
S-(N-butylguanyl)-,
S-(N-benzylguanyl)-,
S-(phenylguanyl)-,
S-(N.N.N'-trimethylguanyl)-,
S-(N.N-dimethyl-N'-phenylguanyl)-,
S-(N.N-dimethyl-N'-(4-chlorophenyl)guanyl)-N.N-dimethyldithiocarbamate.

The free S-guanyldithiocarbamate derivatives according to the invention are none too stable, particularly in an aqueous medium. Salts with inorganic and organic acids are stable. Therefore these salts are preferably used, for example those of the inorganic acids: hydrochloric acid, sulfuric acid and phosphoric acid, those of the aliphatic and aromatic mono-, di- and tricarboxylic acids such as for example, acetic acid, benzoic acid, oxalic acid, tartaric acid, phthalic acid, citric acid, and of the sulphonic acids such as benzene sulphonic acid and paratoluene sulphonic acid, and in particular hydrochloric acid salts.

EXAMPLES

I. S-Guanyl-N.N-Dimethyldithiocarbamate

A solution of 14 g. of N.N-dimethylthiocarbamylchloride in 20 cm.³ of acetone was added, whilst stirring, to a solution of 7.3 g. of thiourea in 250 cm.³ of anhydrous acetone. During the addition, the temperature of the reaction mixture rose from 20 to approximately 40° C. The reaction mixture became cloudy. An oil separated out, which, after a short time, crystallized. The crystallisate was filtered off and washed with dry acetone. Yield: 12.7 g. (64% calculated on thiourea). The substance was dissolved in a little methanol and precipitated therefrom by the addition of ether. The resulting hydrochloric acid salt of S-guanyl-N.N-dimethyldithiocarbamate had a melting point of 132–133° C. The S-guanyl-N.N-dimethyldithiocarbamate liberated therefrom by means of sodium hydroxide solution melted at 70–71° C. (decomposition).

II. S-Guanyl-N.N-Di-n-Propyldithiocarbamate 75 g. of N.N-di-n-propylthiocarbamylchloride were added to a solution of 32 g. of thiourea in 1 litre of dry acetone. After leaving to stand for some hours at approximately 20° C., 2 litres of ether were added to the reaction mixture. A yellow oil separated out which, after some time, crystallized. The crystallisate was dissolved in acetone and precipitated again by the addition of ether. Yield: 61 g. (57% calculated on thiourea). Melting point of the hydrochloric acid salt: 74–80° C.

III. S-Guanyl-N.N-Tetramethylenedithiocarbamate

A solution of 7.5 g. of N.N-tetramethylenethiocarbamylchloride in 50 cm.³ of anhydrous acetone was added to a solution of 3.8 g. of thiourea in 100 cm.³ of anhydrous acetone. The resulting crystalline precipitate of the hydrochloric acid salt was filtered off and washed with acetone. Yield: 9.2 g. (81% calculated on thiourea). Melting point: 143–146° C. (decomposition).

In a corresponding manner S-guanyl-N.N-pentamethylenedithiocarbamate-HCl was prepared from N.N-pentamethylenethiocarbamyl-chloride and thiourea.

IV. S-(N-Methylguanyl)-N.N-Dimethyldithiocarbamate

A solution of 12.4 g. of N.N-dimethylthiocarbamylchloride in 25 cm.³ of anhydrous acetone was added to a solution of 9 g. of N-methylthiourea in 150 cm.³ of anhydrous acetone. After leaving to stand for some hours at 35° C., the resulting crystalline precipitate of the hydrochloric acid salt was filtered off and washed with acetone. Yield: 17.6 g. (82% calculated on N-methylthiourea). Melting point: 140–141° C.

V. S-(N-Phenylguanyl)-N.N-Dimethyldithiocarbamate

A solution of 12.4 g. of N.N-dimethylthiocarbamylchloride in 70 cm.³ of anhydrous acetone was added to a solution of 15.2 g. of N-phenylthiourea in 200 cm.³ of anhydrous acetone. After leaving to stand for some hours at approximately 20° C., the formed crystalline precipitate was filtered off from the hydrochloric acid salt and washed with acetone. Yield 18.7 g. (68% calculated on N-phenylthiourea). Melting point 129–130° C.

Applicants have found that the compounds according to the invention have fungicidal and bactericidal activities and are active, i.a., against the mould species: *Venturia inaequalis* (apple scab), *Cladosporium cucumerinum, Ascochyta pisi, Fusarium culmorum, Phytophthora infestans*. S-guanyl-N.N-dimethyldithiocarbamate has a particularly satisfactory fungicidal activity. A satisfactory activity have in addition: S-(N-phenylguanyl)-N,N-dimethyldithiocarbamate, S-(N-methylguanyl)-N.N-dimethyldithiocarbamate, S-guanyl-N,N-tetramethylenedithiocarbamate and S-guanyl-N.N-pentamethylenedithiocarbamate. S-guanyl-N.N-dimethyldithiocarbamate has a systemic activity; this compound also has a satisfactory curative effect in cases of apple scab (*Venturia inaequalis*). This is of particular importance since the known organo-mercury compounds, active as such, are very poisonous for warmblooded animals. This is not the case with the compounds according to the invention. The S-(N-phenylguanyl)-N.N-dimethyldithiocarbamate excels by its very favourable activity against *Venturia inaequalis*.

The compounds according to the invention may be processed to combating compositions according to manners commonly used for organic fungicides and bactericides. For that purpose, they may be diluted, if desired while adding surface-active substances, dispersion agents, and/or adhesives, with solid inert carriers such as chalk, kaolin, talc, dolomite and the like, or may be dissolved respectively dispersed in for example water or in organic solvents, such for example as acetone, methylethylketone, cyclohexanone, toluene, xylene.

The production of combating compositions is illustrated with reference to the following examples:

50 parts by weight of S-guanyl-N-dimethyldithiocarbamate were mixed intimately with 3 parts by weight of laurylsulphate, 5 parts by weight of sodium ligninesulphate and 42 parts by weight of pulverized dolomite to prepare a wettable powder.

A miscible oil was obtained by dissolving 10 parts by weight of S-(N-phenylguanyl)-N.N-dimethyldithiocarbamate in 60 parts by weight of acetone, 25 parts by weight of xylene, and 5 parts by weight of sodium dodecylnaphthylsulphonate.

A dust was prepared by mixing 5 parts by weight of S-guanyl-N.N-dimethyldithiocarbamate with 95 parts by weight of kaolin and then grinding to an average particle size of approximately 10 micron.

What is claimed is:

1. A member of the group consisting of the guanyl thiocarbamates of the formula

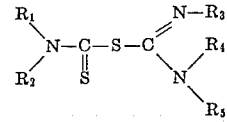

wherein $R_1$ and $R_2$ are each members of the group consisting of alkyl of 1–3 carbons, alkylene of 2–3 carbons, and alkylidene of 1–3 carbons and $R_3$, $R_4$ and $R_5$ are each members of the group consisting of alkyl of 1–12 carbons, phenyl and chlorophenyl and the salts thereof with an acid selected from the group consisting of hydrochloric acid, sulfuric acid, acetic acid, benzoic acid, oxalic acid, tartaric acid, phthalic acid, citric acid, benzene sulfonic acid and paratoluene sulfonic acid.

2. S-guanyl-N,N-dimethyldithio-carbamate.

3. The hydrochloric acid salt of S-guanyl-N,N-dimethyldithio-carbamate.

4. A member of the group consisting of S-(N-phenylguanyl)-N.N-dimethyldithiocarbamate and salts thereof.

5. A member of the group consisting of S-(N-methylguanyl)-N.N-dimethyldithiocarbamate and salts thereof.

6. A member of the group consisting of S-guanyl-N.N-di-n-propyldithiocarbamate and salts thereof.

7. A member of the group consisting of S-guanyl-N.N-tetramethylenedithiocarbamate and salts thereof.

References Cited in the file of this patent

UNITED STATES PATENTS

| Re. 22,750 | Tisdale | Apr. 30, 1946 |
|---|---|---|
| 2,786,866 | Hook et al. | Mar. 26, 1957 |
| 2,835,625 | Lo et al. | May 20, 1958 |
| 2,980,734 | Kosmin | Apr. 18, 1961 |
| 2,983,747 | Campbell et al. | May 9, 1961 |